(12) United States Patent
Chan

(10) Patent No.: US 10,148,446 B2
(45) Date of Patent: Dec. 4, 2018

(54) ELECTRONIC DEVICE AND METHOD FOR SUPPLYING POWER OVER ETHERNET

(71) Applicant: Awareocean Technology Co., Ltd., New Taipei (TW)

(72) Inventor: Hsiang-Chih Chan, New Taipei (TW)

(73) Assignee: Awareocean Technology Co., Ltd., New Taipei (TW)

(*) Notice: Subject to any disclaimer, the term of this patent is extended or adjusted under 35 U.S.C. 154(b) by 210 days.

(21) Appl. No.: 15/057,134

(22) Filed: Mar. 1, 2016

(65) Prior Publication Data

US 2017/0149575 A1    May 25, 2017

(30) Foreign Application Priority Data

Nov. 24, 2015   (TW) .............................. 104138984 A

(51) Int. Cl.
  *H04L 12/10*     (2006.01)
(52) U.S. Cl.
  CPC .................................. *H04L 12/10* (2013.01)
(58) Field of Classification Search
  CPC ........................................................ H04L 12/10
  See application file for complete search history.

(56) References Cited

U.S. PATENT DOCUMENTS

| 9,092,208 | B2 * | 7/2015 | Schlichter | H04L 12/10 |
| 2007/0288771 | A1 * | 12/2007 | Robbins | H04L 12/10 713/300 |
| 2013/0145181 | A1 * | 6/2013 | Maniktala | H04L 12/10 713/300 |
| 2017/0250828 | A1 * | 8/2017 | Buchanan | H04L 12/10 |

FOREIGN PATENT DOCUMENTS

| TW | 200939007 A | 9/2009 |
| TW | M512264 U | 11/2015 |

* cited by examiner

*Primary Examiner* — Ryan Johnson
(74) *Attorney, Agent, or Firm* — CKC & Partners Co., Ltd.

(57) ABSTRACT

An electronic device and a method for power over Ethernet (PoE) are disclosed herein, in which the electronic device includes a first connection unit, a second connection unit and a third connection unit. The second connection unit is electrically coupled to the first connection unit. The third connection unit is electrically coupled to the first connection unit and the second connection unit. The first connection unit is configured to receive power provided by a power sourcing device. The second connection unit is configured to output the power to a powered device. The third connection unit is configured to to output a DC voltage to a load device by using the power.

4 Claims, 4 Drawing Sheets

ELECTRONIC DEVICE AND METHOD FOR SUPPLYING POWER OVER ETHERNET

RELATED APPLICATIONS

This application claims priority to Taiwan Application Serial Number 104138984, filed Nov. 24, 2015, which is herein incorporated by reference.

BACKGROUND

Technical Field

The present invention relates to a power over Ethernet (PoE) technology. More particularly, the present invention relates to an electronic device and a method for supplying PoE.

Description of Related Art

In a power over Ethernet (PoE) technology, a system includes a network power supply equipment (PSE) and a network powered device (PD) that are connected through network wires. The network PSE is configured to transmit power to the network PD through the network wires, and the network PD can then provide power to a load.

However, in a connection relationship of a conventional PoE technology, when a terminal of the network PD is connected to the network PSE (or to a repeater of the network PoE), and another terminal can only be selectively connected to another network PD or a load. After the terminal is connected to the load, the circuit cannot be connected to the network PD or a load. In other words, in a situation with two loads, two network PDs are needed to be connected in parallel to the network PSE respectively, so as to provide power to the two loads. Therefore, in a situation with a huge number of loads, the cost and volume of a PoE system are also very huge.

SUMMARY

In order to reduce the volume of a power over Ethernet (PoE) system, an aspect of the present disclosure is to provide an electronic device for supplying PoE. The electronic device includes a first connection unit, a second connection unit and a third connection unit. The second connection unit is electrically coupled to the first connection unit. The third connection unit is electrically coupled to the first connection unit and the second connection unit. The first connection unit is configured to receive power provided by a power sourcing device. The second connection unit is configured to output the power to a powered device. The third connection unit is configured to output a DC voltage to a load device by using the power.

In one embodiment of the present disclosure, the electronic device further includes a switch unit configured to switch the second connection unit to output the power when the first connection unit is electrically coupled to the power sourcing device and receives the power.

In one embodiment of the present disclosure, wherein the first connection unit is further configured to output the power to the powered device. The second connection unit is further configured to receive the power provided by the power sourcing device. The switch unit switches the first connection unit to output the power when the second connection unit is electrically coupled to the power sourcing device and receives the power.

In one embodiment of the present disclosure, the electronic device further includes a boost unit electrically coupled between the first connection unit and the second connection unit. The boost unit is configured to adjust the power outputted by the second connection unit to be consistent with the power received by the first connection unit.

In one embodiment of the present disclosure, wherein the third connection unit further includes a DC converting unit which is coupled to the first connection unit and configured to convert the power into the DC voltage.

Another aspect of the present disclosure is to provide a method for supplying PoE, which includes step as follows. Power provided by a power sourcing device is received by a first connection unit. The power is outputted to a powered device by a second connection unit. The power is used to output a DC voltage to a load device by a third connection unit.

In one embodiment of the present disclosure, the second connection unit is switched to output the power by a switch unit when the first connection unit is electrically coupled to the power sourcing device and receives the power.

In one embodiment of the present disclosure, the first connection unit is switched to output the power by the switch unit when the second connection unit is electrically coupled to the power sourcing device and receives the power.

In one embodiment of the present disclosure, the power outputted by the second connection unit output is adjusted by a boost unit, so as to be consistent with the power received by the first connection unit.

In one embodiment of the present disclosure, the power is converted into the DC voltage by a DC converting unit.

In sum, the electronic device of the present disclosure can have functions of both extending a power network and providing power to the load device, thereby effectively reducing complexity of circuits of a power over Ethernet system, thus reducing materials and cost for building the circuit.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure. Moreover, the description of steps is not used to limit the execution sequence thereof. Any device with an equivalent effect through rearrangement is also covered by the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

In this document, the term "coupled" may also be termed as "electrically coupled," and the term "connected" may be termed as "electrically connected." "Coupled" and "connected" may also be used to indicate that two or more elements cooperate or interact with each other.

Figure 1:
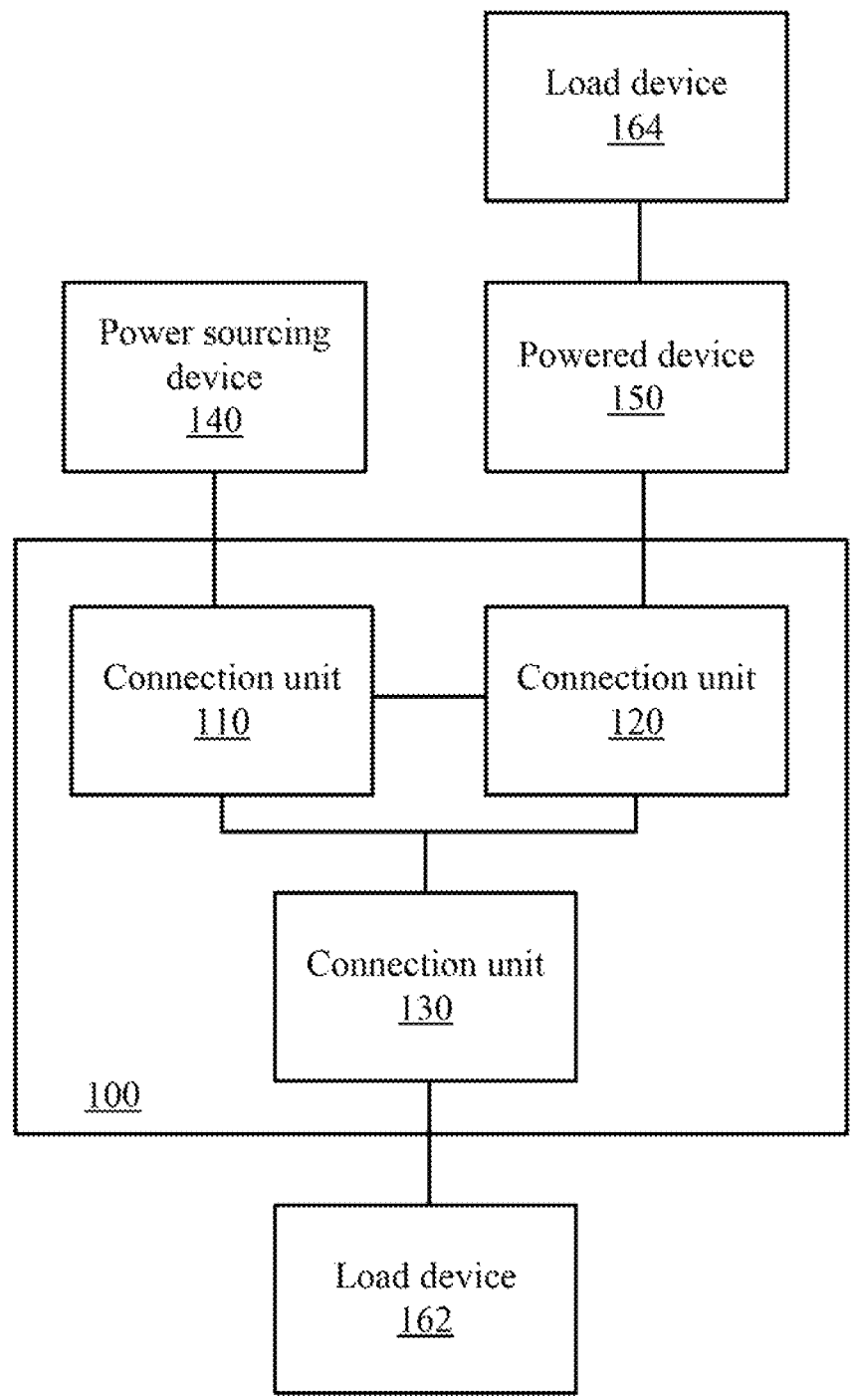
FIG. 1 is a schematic diagram of an electronic device for supplying power over Ethernet according to an embodiment of the present disclosure.

Reference is made to FIG. 1. FIG. 1 is a schematic diagram of an electronic device 100 for supplying power over Ethernet (PoE) according to an embodiment of the present disclosure. The electronic device 100 includes connection units 110-130. The connection unit 120 is electrically coupled to the connection unit 110. The connection unit 130 is electrically coupled to the connection unit 110 and the connection unit 120.

The connection unit 110 is configured to receive power provided by a power sourcing device 140. The connection unit 130 is configured to use the power to output a DC voltage to a load device 162 for operating the load device 162. The connection unit 120 is configured to output the power to a powered device 150, and the powered device 150 can further provide the power to the load device 164.

In one embodiment, the connection unit 120 can be connected and provide the power to another electronic device that is the same as the electronic device 100. Similarly, the another electronic device can provide the power to another load device 162, another powered device 150 and/or another electronic device through a connection unit.

In one embodiment, the power sourcing device 140 may be a power sourcing equipment (PSE) of PoE. The powered device may be a powered device (PD) of PoE.

As a result, compared with the conventional PoE technology, the electronic device 100 of the present disclosure can be electrically coupled to another electronic device or the powered device 150 through the connection unit 120, and provide the power to the load device 162 through the connection unit 130. In other words, the electronic device 100 has functions of both extending power network and providing power to the load device 162.

Figure 2:
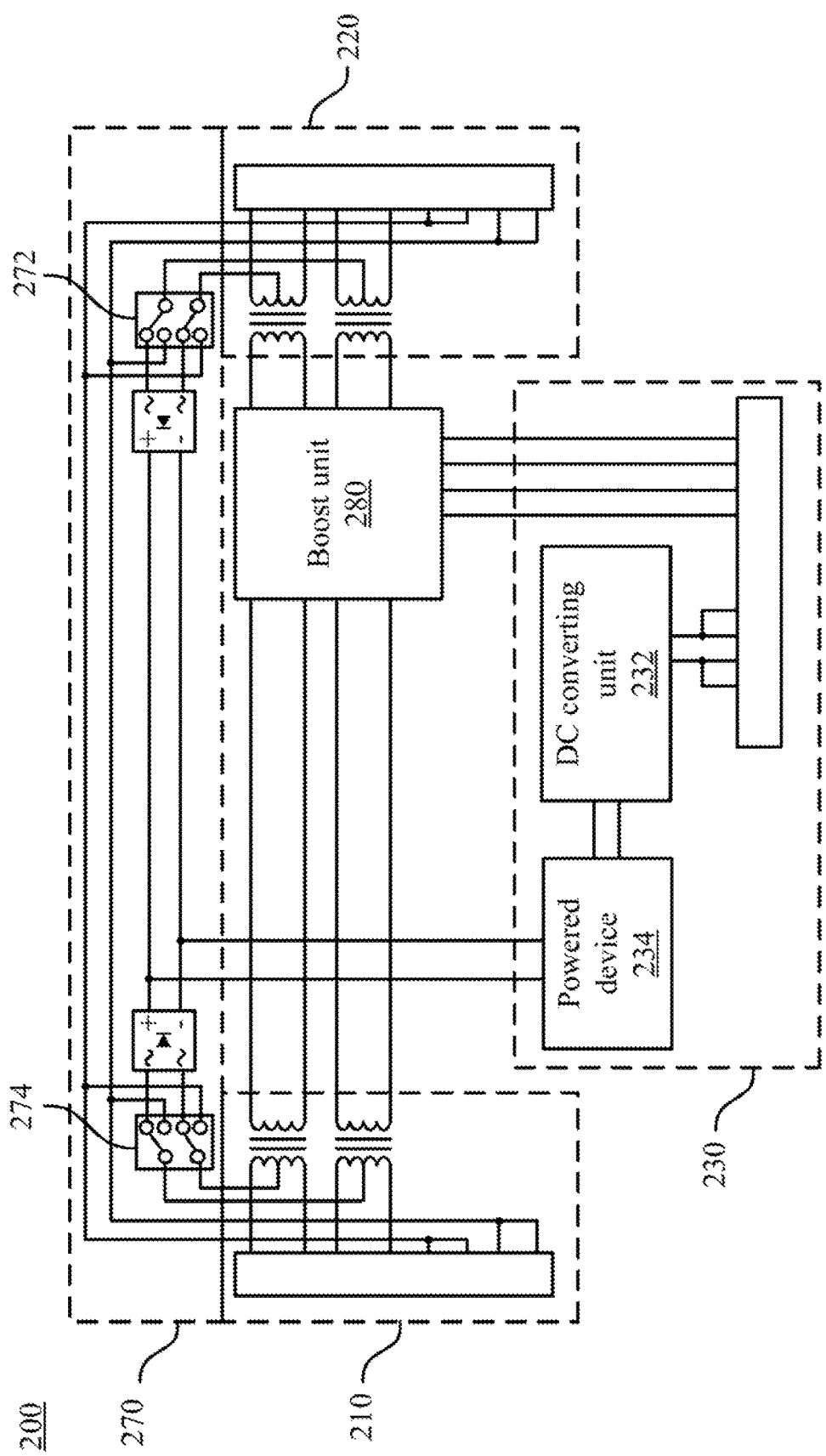
FIG. 2 is a schematic diagram of an electronic device for supplying power over Ethernet according to an embodiment of the present disclosure.

In order to describe the components of the electronic device in detail, reference is made to FIG. 2. FIG. 2 is a schematic diagram of an electronic device 200 for supplying PoE according to an embodiment of the present disclosure. The electronic device 200 has substantially the same hardware as the electronic device 100 in FIG. 1 except a switch unit 270, a boost unit 280 and a DC converting unit 232. The boost unit 280 is electrically coupled between a connection unit 210 and a connection unit 220. The DC converting unit 232 is coupled to the connection unit 210. In practice, the switch unit 270 may be a switching circuit, the boost unit 280 may be a boost circuit, and the DC converting unit 232 may be a DC converting circuit.

Functions of the connection units 210 and 220 of the electronic device 200 are interchangeable. Specifically, the connection units 210 and 220 can be configured to receive power provided by the power sourcing device 140, and to output the power to the powered device 150. When the connection unit 210 receives the power provided by the power sourcing device 140, the switch unit 270 switches switch 272 to enable the connection unit 220 to output the power. In contrast, when the connection unit 220 receives the power provided by the power sourcing device 140, the switch unit 270 switches switch 274 to enable the connection unit 210 to output the power.

As a result, the electronic device 200 receives the power from the power sourcing device 140 through the connection unit 210 (or the connection unit 220), and the switch unit 270 switches the switch 272 (or the switch 274) accordingly to enable the connection unit 220 (or the connection unit 210) to output the power to the powered device 150. A user may connect the power sourcing device 140 to one of the connection units 210 and 220 according to actual demands, and the function of the other connection unit is converted into a function of outputting power automatically.

In order to maintain the transmitted voltage, in one embodiment, the electronic device 200 includes a boost unit 280. In a situation in which the connection unit 210 receives power from the power sourcing device 140 and the connection unit 220 outputs the power to the powered device 150, the boost unit 280 is configured to adjust the power outputted by the connection unit 220 to be consistent with the power received by the connection unit 210. Similarly, in a situation in which the connection unit 220 receives power of the power sourcing device 140 and the connection unit 210 outputs the power to the powered device 150, the boost unit 280 is configured to adjust the power outputted by the connection unit 210 to be consistent with the power received by the connection unit 220.

In order to be adapted to different specifications of load devices, in one embodiment, the connection unit 230 of the electronic device 200 includes a DC converting unit 232. The DC converting unit 232 is configured to convert the power that is received from the power sourcing device 140 by the connection unit 210 (or the connection unit 220) into a DC voltage. In one embodiment, the connection unit 230 includes the DC converting unit 232 and a powered device 234, and the powered device 234 is electrically coupled to the connection unit 210 (or the connection unit 220) to receive power from the power sourcing device 140. The DC converting unit 232 then converts the power into a DC voltage and outputs the DC voltage to the load device 162.

Figure 3A:
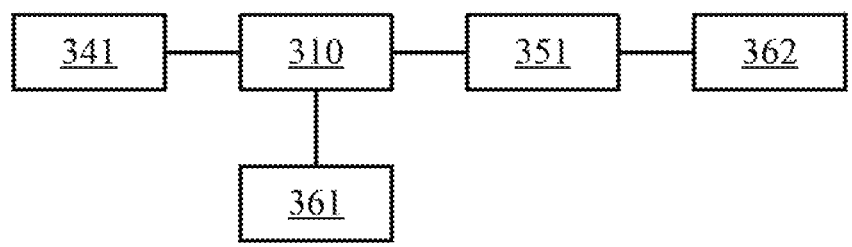
FIGS. 3A-3C are schematic diagrams of power over Ethernet systems with electronic devices according to some embodiments of the present disclosure.
Figure 3B:
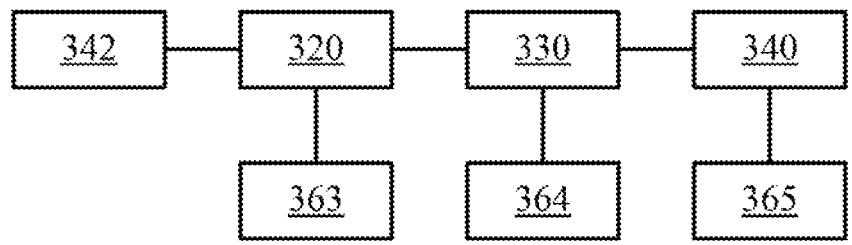
Figure 3C:
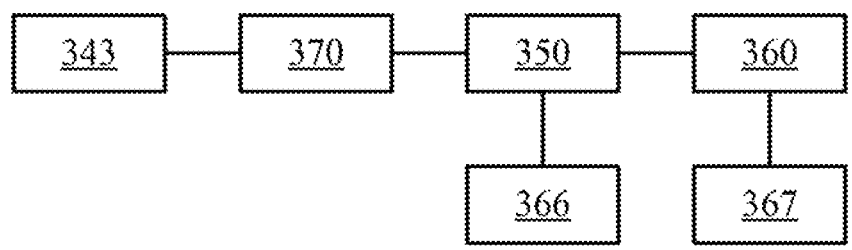

In order to describe the differences between the electronic device of the present disclosure and the conventional power over Ethernet system, references are made to FIGS. 3A-3C.

In one embodiment, as shown in FIG. 3A, an electronic device 310 receives power from a power sourcing device 341, and outputs the power to a powered device 351 and a load device 361 at the same time. The powered device 351 may be connected to a load device 362. In the present embodiment, a series circuit starting from the power sourcing device 341 can provide power to two load devices (i.e., the load devices 361 and 362).

Alternatively, in one embodiment, as shown in FIG. 3B, an electronic device 320 receives power from a power sourcing device 342, and outputs the power to an electronic device 330 and a load device 363 at the same time. The electronic device 330 receives the power from the electronic device 320, and outputs the power to an electronic device 340 and a load device 364 at the same time. An electronic device 340 receives the power from the electronic device 330, and outputs the power to the load device 365 at the same time. In the present embodiment, a series circuit starting from the power sourcing device 342 can provide power to three load devices (i.e., the load devices 363-365).

Alternatively, in one embodiment, as shown in FIG. 3C, a repeater 370 transmits power from a power sourcing device 343 to an electronic device 350. The electronic device 350 receives the power, and outputs the power to an electronic device 360 and a load device 366 at the same time. The electronic device 360 receives the power from the electronic device 350, and outputs the power to a load device 367. In the present embodiment, a series circuit starting from the power sourcing device 343 can provides power to two load devices (i.e., the load devices 366 and 367). It should be noted that, the aforementioned electronic devices 340 and 360 can also be connected to another electronic device to extend the series circuit starting from the power sourcing devices 342 and 343.

Figure 4:
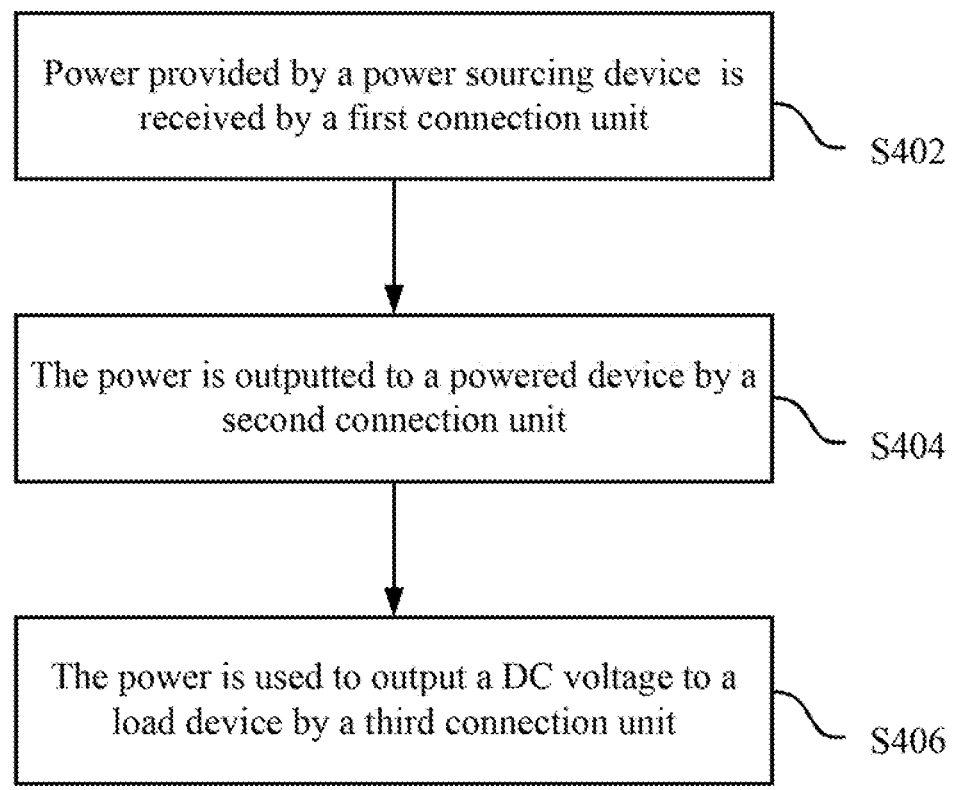
FIG. 4 is a flow chart of a method for supplying power over Ethernet according to an embodiment of the present disclosure.

FIG. 4 is a flow chart of a method 400 for supplying power over Ethernet according to an embodiment of the present disclosure. The method 400 for supplying PoE includes steps S402-S406 and can be implemented by the electronic devices 100 and 200 for supplying PoE as shown in FIGS. 1 and 2. However, those skilled in the art should understand that, unless a particular sequence is specified, the sequence of the steps in the present embodiment can be adjusted according to actual needs. Moreover, all or some of the steps can even be executed simultaneously. Specific implementation is disclosed as above, and would not be repeated herein.

In step S402, power provided by a power sourcing device 140 is received by a first connection unit for example, the connection units 110 and 210).

In step S404, the power is outputted to a powered device 150 by a second connection unit (for example, the connection units 120 and 220).

In step S406, the power is used to output a DC voltage to a load device 162 by a third connection unit (for example, the connection units 130 and 230).

As above mentioned, functions of the connection units 210 and 220 are interchangeable. Through the switch unit 270, when the connection unit 210 is electrically coupled to the power sourcing device 140 and receives power, the connection unit 220 is switched to output the power. Alternatively, through the switch unit, when the connection unit 220 is electrically coupled to the power sourcing device 140 and receives power, the connection unit 210 is switched to output the power.

In sum, through the above embodiments, the electronic device 100 of the present disclosure can have functions of both extending power network and providing power to the load device 162 to effectively reduce complexity of circuits of a power over Ethernet system and then reduce materials and cost for building the circuit.

Even though the present disclosure is disclosed as above, the disclosure is not used to limit the present disclosure. It will be apparent to those skilled in the art that various modifications and variations can be made to the present disclosure without departing from the spirit or scope of the invention; thus, it is intended that the range protected by the present disclosure should refer to the scope of the following claims.

What is claimed is:

1. An electronic device for supplying power over Ethernet (PoE), the electronic device comprising:
    a first connection unit configured to receive power provided by a power sourcing device;
    a second connection unit electrically coupled to the first connection unit;
    a switch unit comprising a first switch electrically coupled to the first connection unit and a second switch electrically coupled to the second connection unit, wherein when a power sourcing device is connected to the first connection unit, the first connection unit receives power provided by the power sourcing device, and then the switch unit switches the second switch to enable the second connection unit to output the power to a powered device, wherein when the power sourcing device is connected to the second connection unit, the second connection unit receives the power provided by the power sourcing device, and then the switch unit switches the first switch to enable the first connection unit to output the power to the powered device; and
    a third connection unit electrically coupled to the first connection unit and the second connection unit, wherein the third connection unit is configured to output a DC voltage to a load device by using the power.

2. The electronic device of claim 1, wherein the third connection unit further comprises:
    a DC converting unit coupled to the first connection unit and configured to convert the power into the DC voltage.

3. A method for supplying power over Ethernet, the method comprising:
    receiving, by a first connection unit, power provided by a power sourcing device when the power sourcing device is connected to the first connection unit, and then switching a second switch to enable a second connection unit to output the power to a powered device;
    receiving, by a second connection unit, power provided by the power sourcing device when the power sourcing device is connected to the second connection unit, and then switching a first switch to enable a first connection unit to output the power to the powered device; and
    using the power, by a third connection unit, to output a DC voltage to a load device.

4. The method of claim 3, further comprising:
    converting, by a DC converting unit, the power into the DC voltage.

* * * * *